United States Patent
Israni (10) Patent No.: US 11,249,852 B2
(45) Date of Patent: Feb. 15, 2022

(54) EFFICIENT TRANSFER OF COPY-ON-WRITE SNAPSHOTS

(71) Applicant: Portworx, Inc., Los Altos, CA (US)

(72) Inventor: Dinesh Israni, San Jose, CA (US)

(73) Assignee: Portwonx, Inc., Los Altos, CA (US)

( * ) Notice: Subject to any disclaimer, the term of this patent is extended or adjusted under 35 U.S.C. 154(b) by 0 days.

(21) Appl. No.: 16/050,676

(22) Filed: Jul. 31, 2018

(65) Prior Publication Data
US 2020/0042393 A1 Feb. 6, 2020

(51) Int. Cl.
G06F 11/14 (2006.01)
G06F 3/06 (2006.01)

(52) U.S. Cl.
CPC ........ *G06F 11/1451* (2013.01); *G06F 3/0604* (2013.01); *G06F 3/065* (2013.01); *G06F 3/067* (2013.01); *G06F 11/1469* (2013.01); G06F 2201/84 (2013.01)

(58) Field of Classification Search
CPC ............. G06F 11/1451; G06F 11/1469; G06F 3/0604; G06F 3/065; G06F 3/067; G06F 2201/84
See application file for complete search history.

(56) References Cited

U.S. PATENT DOCUMENTS

| | | |
|---|---|---|
| 6,718,427 B1 | 4/2004 | Carlson |
| 6,816,941 B1 | 11/2004 | Carlson |
| 7,089,395 B2 | 8/2006 | Jacobson |
| 7,412,583 B2 | 8/2008 | Burton |
| 7,434,017 B2 | 10/2008 | Maruyama |
| 7,529,782 B2 * | 5/2009 | Prahlad ............... G06F 11/1435 |
| 7,613,878 B2 | 11/2009 | Mori |
| 7,617,371 B2 | 11/2009 | Fujimoto |
| 7,734,888 B1 | 6/2010 | Hamilton |
| 7,809,917 B2 | 10/2010 | Burton |
| 7,873,809 B2 | 1/2011 | Kano |
| 7,945,748 B2 | 5/2011 | Shibayama |
| 8,055,723 B2 | 11/2011 | Acedo |
| 8,086,808 B2 | 12/2011 | Ichikawa |
| 8,225,057 B1 | 7/2012 | Zheng |
| 8,230,069 B2 | 7/2012 | Korupolu |
| 8,250,327 B2 | 8/2012 | Fuji |
| 8,291,159 B2 | 10/2012 | Rajagopal |
| 8,489,845 B2 | 7/2013 | Ozaki |
| 8,495,331 B2 | 7/2013 | Matsumoto |
| 8,516,215 B2 | 8/2013 | Satoyama |
| 8,539,194 B2 | 9/2013 | Inoue |
| 8,612,679 B2 | 12/2013 | Schnapp |
| 8,612,776 B2 | 12/2013 | Hakamata |
| 8,745,354 B2 | 6/2014 | Mori |
| 8,769,235 B2 | 7/2014 | Satoyama |

(Continued)

*Primary Examiner* — David Yi
*Assistant Examiner* — Dustin B. Fulford
(74) *Attorney, Agent, or Firm* — ALG Intellectual Property, LLC (57) ABSTRACT

Copy-on-Write (CoW) snapshots share data on disk for extents that have not been overwritten, which allows for efficient use of disk space. A chain of snapshots may be created, where each snapshot corresponds to a point in time. A sequence of snapshots may be copied by rebuilding each snapshot for the destination volume based on the source volume, resulting in memory usage at the destination volume substantially similar to the memory usage of the snapshot sequence at the source volume.

20 Claims, 9 Drawing Sheets

(56) References Cited

U.S. PATENT DOCUMENTS

| | | |
|---|---|---|
| 8,775,730 B2 | 7/2014 | Inoue |
| 8,862,833 B2 | 10/2014 | Noll |
| 8,863,139 B2 | 10/2014 | Kakeda |
| 8,880,810 B2 | 11/2014 | Yamamoto |
| 9,182,926 B2 | 11/2015 | Naganuma |
| 9,201,607 B2 | 12/2015 | Satoyama |
| 9,229,860 B2 | 1/2016 | Matsuzawa |
| 9,237,131 B2 | 1/2016 | Nahum |
| 9,569,245 B2 | 2/2017 | Iwamatsu |
| 9,747,036 B2 | 8/2017 | Maki |
| 9,760,290 B2 | 9/2017 | Jayaraman |
| 9,760,294 B2 | 9/2017 | Miwa |
| 10,365,980 B1 | 7/2019 | Bromling |
| 10,452,293 B2 | 10/2019 | Yamamoto |
| 10,503,441 B2 | 12/2019 | Israni et al. |
| 10,564,870 B1 | 2/2020 | Greenwood |
| 10,594,571 B2 | 3/2020 | Dippenaar |
| 10,628,088 B2 | 4/2020 | Matsushita |
| 10,628,200 B2 | 4/2020 | Hadas |
| 10,664,182 B2 | 5/2020 | Oohira |
| 10,949,125 B2 | 3/2021 | Liguori |
| 10,956,063 B2 | 3/2021 | Yamamoto |
| 2002/0103889 A1 | 8/2002 | Markson |
| 2004/0068611 A1 | 4/2004 | Jacobson |
| 2006/0107016 A1 | 5/2006 | Murotani |
| 2006/0107017 A1 | 5/2006 | Serizawa |
| 2006/0282641 A1 | 12/2006 | Fujimoto |
| 2007/0233987 A1 | 10/2007 | Maruyama |
| 2007/0233992 A1 | 10/2007 | Sato |
| 2008/0028143 A1 | 1/2008 | Murase |
| 2008/0222376 A1 | 9/2008 | Burton |
| 2009/0150639 A1 | 6/2009 | Ohata |
| 2009/0228589 A1 | 9/2009 | Korupolu |
| 2009/0240880 A1 | 9/2009 | Kawaguchi |
| 2009/0254636 A1 | 10/2009 | Acedo |
| 2010/0011185 A1 | 1/2010 | Inoue |
| 2010/0017577 A1 | 1/2010 | Fujimoto |
| 2010/0082900 A1 | 4/2010 | Murayama |
| 2010/0100604 A1 | 4/2010 | Fujiwara |
| 2010/0332882 A1 | 12/2010 | Nayak |
| 2011/0060885 A1 | 3/2011 | Satoyama |
| 2011/0066823 A1 | 3/2011 | Ando |
| 2011/0161406 A1 | 6/2011 | Kakeda |
| 2011/0185135 A1 | 7/2011 | Fuji |
| 2011/0185139 A1 | 7/2011 | Inoue |
| 2011/0191537 A1 | 8/2011 | Kawaguchi |
| 2011/0252214 A1 | 10/2011 | Naganuma |
| 2011/0264868 A1 | 10/2011 | Takata |
| 2011/0276772 A1 | 11/2011 | Ohata |
| 2012/0166751 A1 | 6/2012 | Matsumoto |
| 2012/0173838 A1 | 7/2012 | Noll |
| 2012/0226885 A1 | 9/2012 | Mori |
| 2012/0311260 A1 | 12/2012 | Yamagiwa |
| 2013/0117448 A1 | 5/2013 | Nahum |
| 2014/0006726 A1 | 1/2014 | Yamamoto |
| 2014/0281339 A1 | 9/2014 | Satoyama |
| 2014/0372723 A1 | 12/2014 | Bobroff |
| 2015/0277955 A1 | 10/2015 | Iwamatsu |
| 2015/0331793 A1 | 11/2015 | Matsuzawa |
| 2016/0004476 A1 | 1/2016 | Emaru |
| 2016/0092132 A1* | 3/2016 | Hildebrand ........... G06F 11/203 711/162 |
| 2016/0094410 A1 | 3/2016 | Anwar |
| 2016/0253114 A1 | 9/2016 | Deguchi |
| 2017/0090774 A1 | 8/2017 | Dambal |
| 2017/0220282 A1 | 8/2017 | Dambal |
| 2017/0222890 A1 | 8/2017 | Dippenaar |
| 2017/0308316 A1 | 10/2017 | Yamamoto |
| 2017/0359221 A1 | 12/2017 | Hori |
| 2018/0004447 A1 | 1/2018 | Oohira |
| 2019/0129740 A1 | 5/2019 | Hadas |
| 2019/0266022 A1 | 8/2019 | Israni et al. |
| 2019/0272222 A1 | 9/2019 | Wei |
| 2020/0042213 A1 | 2/2020 | Yamamoto |
| 2020/0073552 A1 | 3/2020 | Sangle |
| 2020/0104151 A1 | 4/2020 | Shibayama |
| 2020/0264956 A1 | 8/2020 | Thomas |
| 2020/0409600 A1 | 12/2020 | Liguori |

* cited by examiner

EFFICIENT TRANSFER OF COPY-ON-WRITE SNAPSHOTS

TECHNICAL FIELD

The present disclosure relates generally to digital storage volume management and more specifically to the management of copy-on-write snapshots.

DESCRIPTION OF RELATED ART

In computer systems, a snapshot is the state of a system at a particular point in time. For example, a snapshot may be captured of a storage volume, folder, application state, or any other unit of storage. The unit of storage covered by a snapshot is referred to as an extent. The snapshot may include any and all information involved in restoring the system to the state at the time the snapshot was captured.

Copy-on-Write (CoW) snapshots share data blocks on disk for extents that have not been overwritten, which allows for efficient use of disk space. For example, a chain of snapshots may be created, where each snapshot corresponds to a point in time. A particular snapshot need not include all data blocks associated with the system at the time, but rather need include only the data blocks that have changed since the previous snapshot was captured. Rather than duplicating data blocks that are already stored in a previous snapshot, references to that previously stored data blocks may be included instead.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Various embodiments of the present invention relate generally to devices, systems, and methods for transferring copy-on-write snapshots. According to various embodiments, data associated with a virtual storage volume may be copied from a first compute node to a second compute node, which may each include a respective processor and a respective memory module. The virtual storage volume may be associated with one or more snapshots including a designated snapshot capturing a designated state of the virtual storage volume at a designated point in time. The designated snapshot may include information for restoring the virtual storage volume to the designated state.

According to various embodiments, the designated snapshot may be replicated from the first compute node to the second compute node. The designated snapshot may include a designated data reference portion, the designated data reference portion may include a designated plurality of data references that refer to source storage locations associated with source data stored in the virtual storage volume on the first compute node.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular containerized storage environments. However, it should be noted that the techniques of the present invention apply to a wide variety of different containerized storage environments. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Example Embodiments

Copy-on-Write (CoW) snapshots share data blocks on disk for extents that have not been overwritten, which allows for efficient use of disk space. For example, a chain of snapshots may be created, where each snapshot corresponds to a point in time. A particular snapshot need not include all data blocks associated with the system at the time, but rather need include only the data blocks that have changed since the previous snapshot was captured. Rather than duplicating data blocks that are already stored in a previous snapshot, references to that previously stored data blocks may be included instead. If data blocks referenced in a CoW snapshot are rewritten, then the data blocks may first be copied to the earliest snapshot in which it they referenced before they is overwritten in the volume itself, which leads to the name "Copy-on-Write."

When a chain of snapshots needs to be moved across nodes, it is necessary to maintain this sharing of extents/data so as not to use extra space as well as to reduce transfer times between nodes. Such transfers are required in cases including but not limited to scenarios in a distributed storage solution where volumes are being rebalanced across nodes or when the number of replicas for the snapshots and volumes is to be increased. Such transfers present problems because the references in CoW snapshots refer to memory locations on the source volume from which the CoW snapshots originate, not memory locations on the destination volume to which the CoW snapshots are being copied.

Conventional techniques for replicating snapshots involve copying snapshots in their entirety without considering the shared extents/data associated with them. For example, consider a volume V1 of size 100 GB which has five snapshots taken at regular intervals (S1-S5). Between these snapshots 10 GB of new data was written to the volume and no data was deleted from the volume. S5 was the last snapshot taken and no data has been written to V1 since then, so S5 and V1 are identical. Since these are CoW snapshots, the total size used by the snapshots and the volume would be 50 GB even though the accumulative size of data on the individual volumes is 150 GB (10+20+30+40+50). Thus, under conventional techniques, copying these snapshots as whole copies would end up requiring 150 GB on the new node and require the transfer of all the shared data multiple times.

According to various embodiments, techniques and mechanisms described herein provide for the transfer of snapshots in a more efficient manner. A sequence of snapshots may be copied by rebuilding each snapshot for the destination volume based on the source volume, resulting in memory usage at the destination volume substantially similar to the memory usage of the snapshot sequence at the source volume.

According to various embodiments, techniques and mechanisms described herein provide for substantially improved performance of the computer itself. For example, by avoiding the transfer of duplicated data, inter-node network traffic may be substantially reduced. Further, storage space at the destination node may be used in a much more efficient manner.

Figure 1:
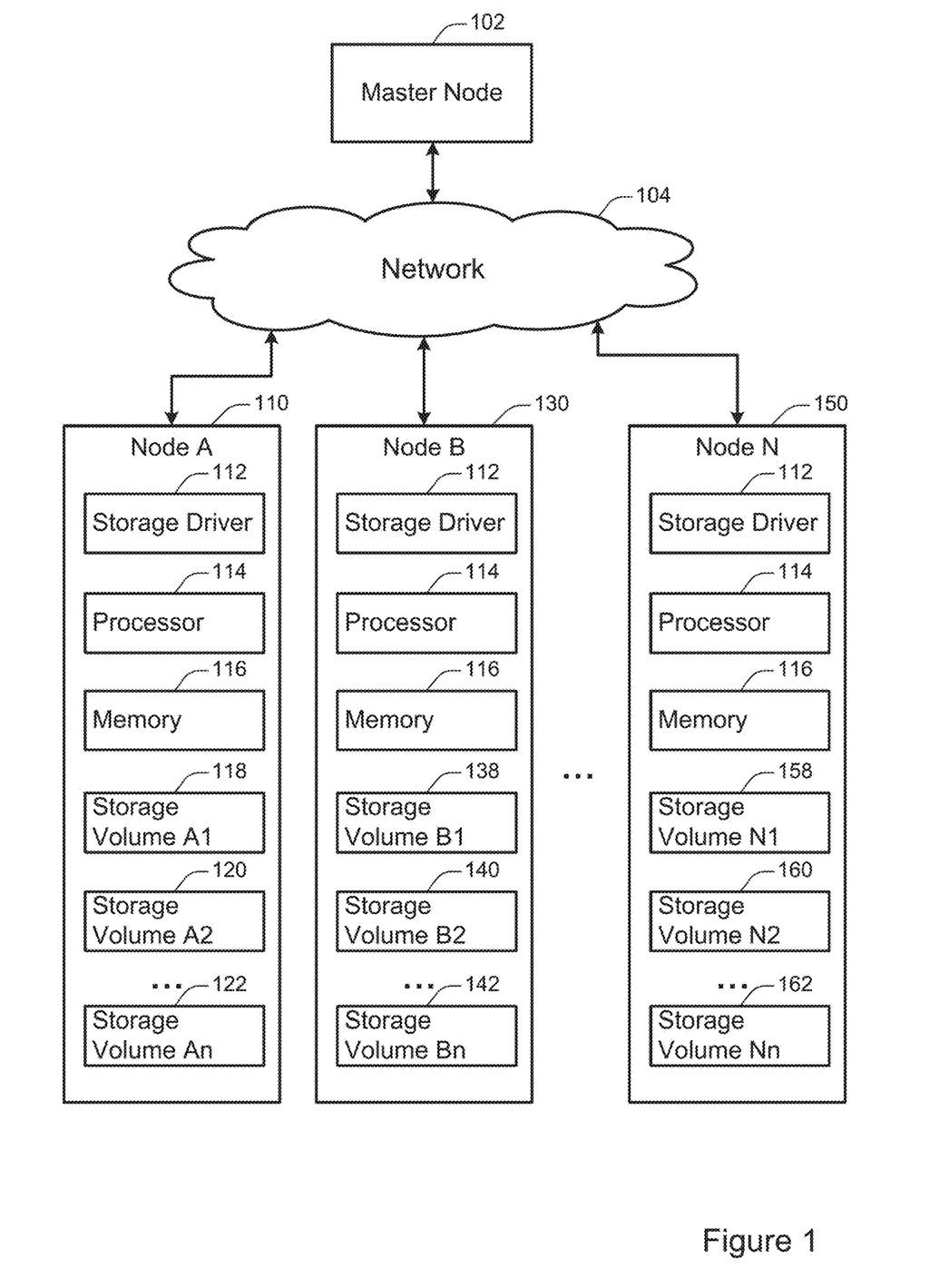
FIG. 1 illustrates an example of a configuration of nodes, provided in accordance with one or more embodiments.

FIG. 1 illustrates an example of a configuration of nodes, provided in accordance with one or more embodiments. According to various embodiments, each node may be configured to read and/or write data on one or more storage volumes. The configuration includes the Master Node 102, the Node A 110, the Node B 130, and the Node N 150. The nodes communicate via a network 104.

According to various embodiments, the network 104 may be a public or private network. For example, the nodes may be located within a particular organization, within a cloud infrastructure, or in some combination thereof.

In particular embodiments, the Master Node 102 may coordinate communication between the different storage nodes. For example, the master Node 102 may transmit instructions to replicate or rebalance storage volumes across storage nodes.

In some embodiments, each node includes a processor 114, a memory module 116, and a storage driver 112. The storage driver may be configured to manage the storage volumes associated with the node.

According to various embodiments, the system may include various numbers of nodes and/or storage volumes. For example, the configuration shown in FIG. 1 includes the storage volumes A1 118, A2 120, An 122, B1 138, B2 140, Bn 142, N1 158, N2 160, and Nn 162. However, other configurations may include different numbers of nodes and storage volumes.

In some implementations, each storage volume may store data associated with one or more applications. Accordingly, by constructing a snapshot of a storage volume, a state associated with an application may be captured and retained.

In particular embodiments, a snapshot corresponds to the entirety of the data associated with a particular storage volume. Alternately, a snapshot may correspond to a portion of the data associated with a particular storage volume. For example, a snapshot may correspond to one or more folders, files, or other units of storage.

Figure 2:
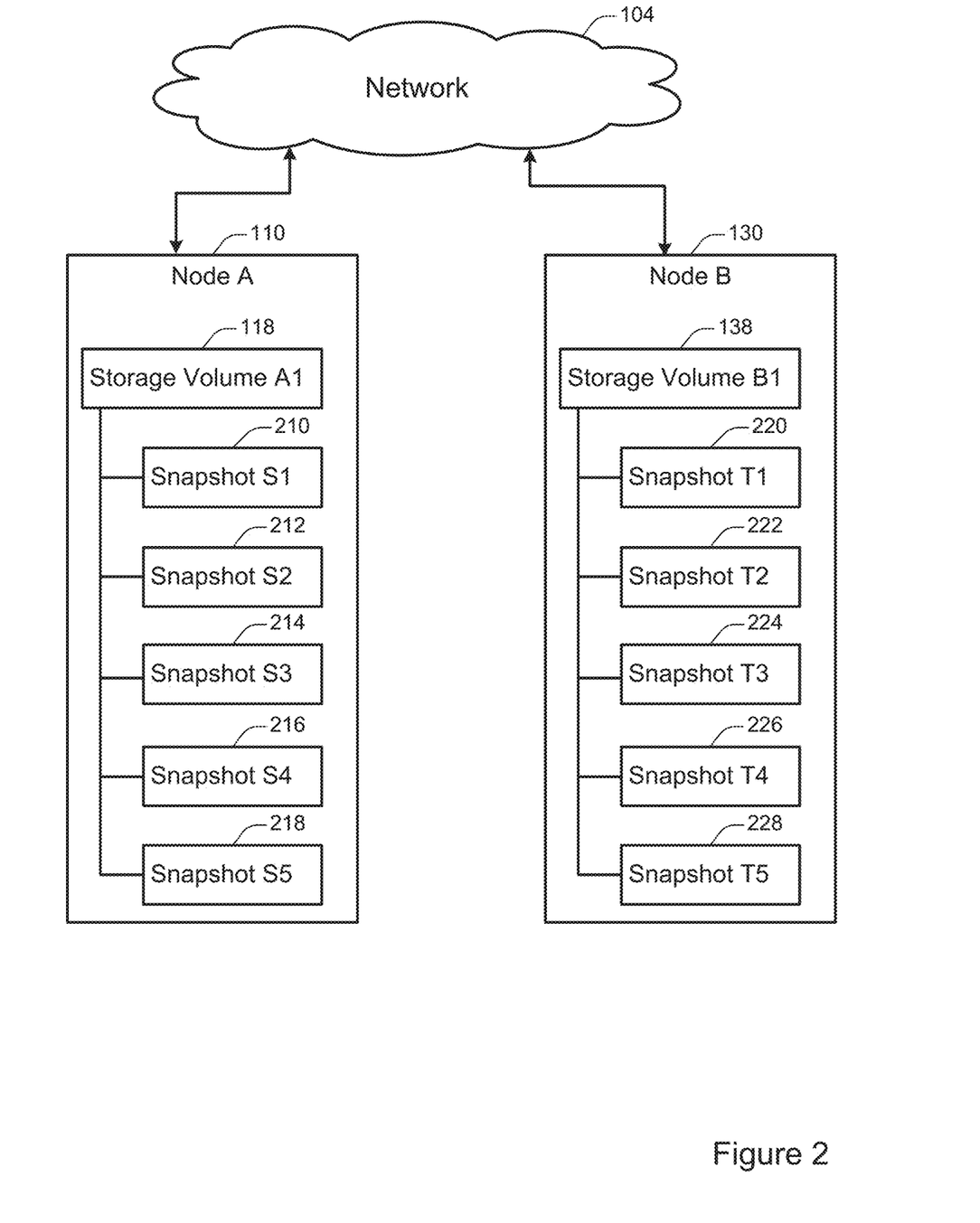
FIG. 2 illustrates an example of a configuration of snapshots, provided in accordance with one or more embodiments.

FIG. 2 illustrates an example of a configuration of snapshots, provided in accordance with one or more embodiments. The configuration of snapshots shown in FIG. 2 includes the Node A 110 and the Node B 130 in communication via the network 104. The Node A 118 includes the Volume A1 118 and the Node B 130 includes the Volume B1 138, which is a copy of the Volume A1 118.

In some embodiments, each snapshot shown in FIG. 2 represents a copy of the associated volume at a particular point in time. For example, the Snapshots S1 210, S2 212, S3 214, S4 217, and S5 218 represent successive points in time associated with the Volume A1 118. Using these snapshots, the Volume A1 118 may be restored to the state at any point in time associated with a snapshot. Additional details regarding the storage of data associated with a snapshot are described with respect to FIG. 3. Additional details regarding the restoration of system states from snapshots are described with respect to FIG. 6.

According to various embodiments, the volume B1 138 may be a replicated copy of the volume A1 118. For example, the Volume B1 138 may be created to provide additional real-time redundancy in the event that the Node A 110 fails and the volume A1 118 is corrupted or lost. As another example, the Volume B1 138 may be created to provide additional real-time redundancy to support a greater volume of read queries.

According to various embodiments, the volume B1 138 may replace the volume A1 118. For example, the Volume B1 138 may be created to rebalance storage from the Node A 110 to the Node B 130.

In particular embodiments, the volume B1 138 may clone the volume A1 118. For example, the Volume B1 138 may be created to clone the state of an application from the Node A 110 to the Node B 130.

As part of the procedure for copying the Volume A1 118 to the volume A2 138, the Snapshots T1 220, T2 222, T3 224, T4 226, and T5 228 are created. Additional details regarding the copying of volumes and snapshots are discussed with respect to FIG. 4.

Figure 3:
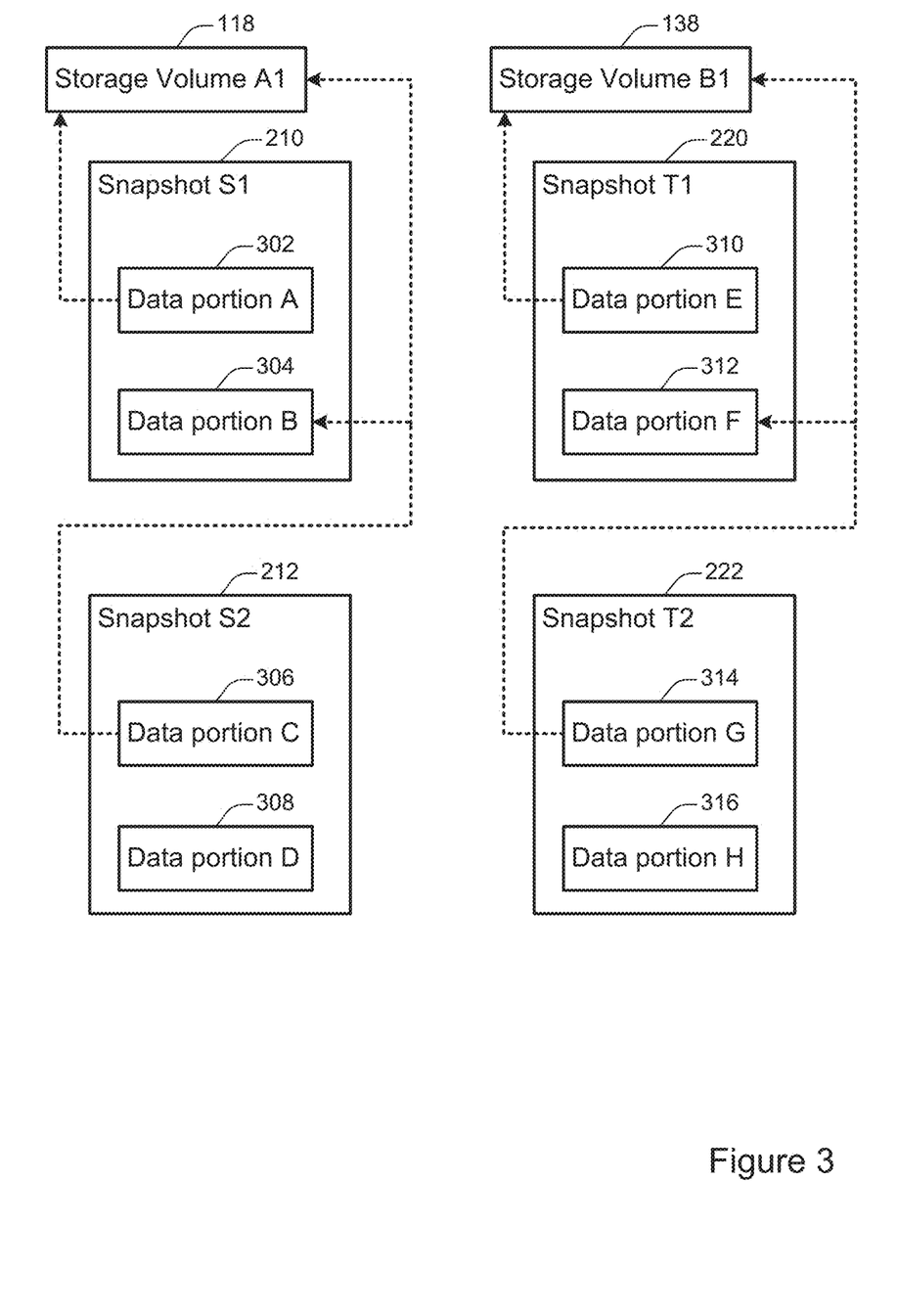
FIG. 3 illustrates an example of a configuration of data, provided in accordance with one or more embodiments.

FIG. 3 illustrates an example of a configuration of data, provided in accordance with one or more embodiments. The configuration of data shown in FIG. 3 includes Snapshot S1 210 and Snapshot S2 212, both of which correspond to Volume A1 118, as well as Snapshot T1 220 and Snapshot T2 222, both of which correspond to Volume B1 138. The snapshots included data portions A-H 302-316.

In the example configuration shown in FIG. 3, the Snapshot S1 210 represents the first snapshot captured of the Volume A1 118. The data included in the Snapshot S1 210 includes two portions. The data portion A 302 includes data blocks that currently remain in Volume A1 118. Because the data blocks included in data portion A 302 are still in Volume A1 118, the Snapshot S1 210 does not store a copy of the data blocks included in data portion A 302. Instead, the data portion A 302 is stored as a set of one or more references to the data blocks as they reside in the Volume A1. For example, a reference may act as a memory pointer, which typically requires substantially less storage space than the memory to which it refers.

The data portion B 304 includes data blocks that were present in the Volume A 118 at the time the Snapshot S1 210 was captured but is no longer present in the Volume A 118 at the current point in time. A copy of this data is stored in the Snapshot S1 210 so that it is available if a request to restore the system to the state represented in the Snapshot S1 210 is received.

The Snapshot S2 212 represents the second snapshot captured of the Volume A1 118. The data blocks included in the Snapshot S2 212 include two portions. The data portion C 306 includes data blocks included in the Snapshot S1 210. Because the data blocks included in data portion C 306 are still in the Snapshot S1 210, the Snapshot S2 212 does not store a copy of the data blocks included in data portion C 306. Instead, the data portion C 306 is stored as a set of one or more references to the data blocks as they reside in the Snapshot S2 212.

In particular embodiments, the references in the data portion C 306 may be pointers to data blocks stored in the Snapshot S1 210 (e.g., in the data portion B 304) or may be pointers to references to data blocks stored in the storage volume A1 118. For example, some of these references may point to data blocks stored by value in the Snapshot S1 210 (i.e. in the data portion B 304) that no longer remain in the Storage Volume A1 118. As another example, other references may point to data blocks that do remain in the Storage Volume A1 118. Thus, the data portion C 306 and the data portion A 302 may include some of the same references to data blocks that remain in the storage volume A1 118.

The Snapshot T1 220 and the Snapshot T2 222, along with their associated data portions, represent copies of the Snapshot S1 210 and Snapshot S2 212. Similarly, the Volume B1 138 is a copy of the Volume A1 118. However, the references included in the data portion G 314 and the data portion E 310 point to memory addresses associated with the Snapshot T1 220 and the Volume B1 138 rather than the corresponding addresses associated with the Snapshot S1 210 and the Volume A1 118.

Figure 4:
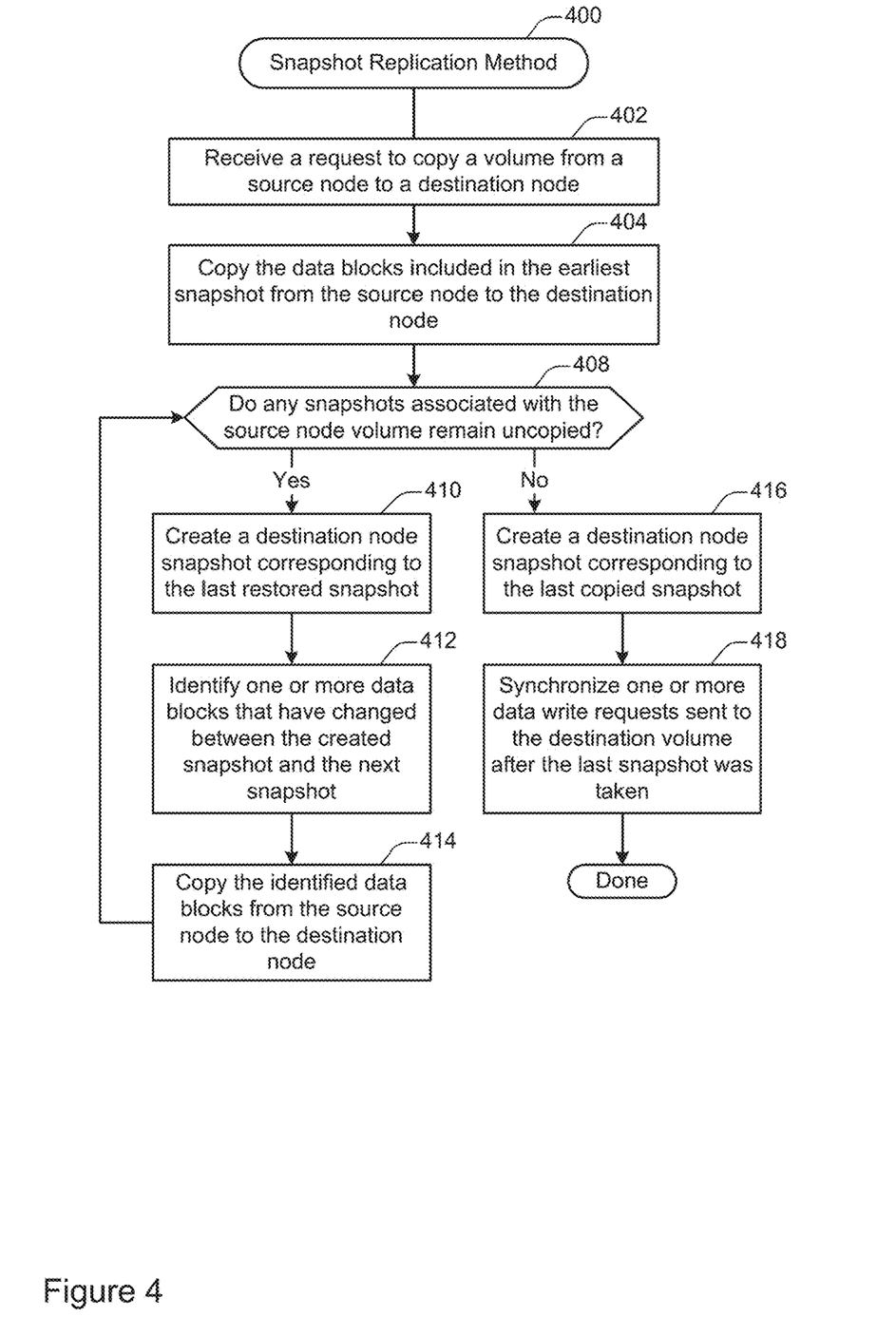
FIG. 4 illustrates an example of a method for replicating one or more snapshots, performed in accordance with one or more embodiments.

FIG. 4 illustrates an example of a method 400 for replicating one or more snapshots, performed in accordance with one or more embodiments. The method 400 may be performed at least in part at a node having one or more storage volumes mounted thereon. In particular embodiments, the method 400 may be performed at least in part at a scheduler, such as the scheduler 826 and/or the scheduler agent 832 shown in FIG. 8.

At 402, a request is received to copy a volume from a source node to a destination node. According to various embodiments, the request may be received at a privileged storage container. The request may include information such as the identity of the node to copy the volume from, the identity of the node to copy the volume to, and the identity of the volume to be copied.

In particular embodiments, the request may be generated manually. For example, a user may request to copy a volume from one node to another node. Alternately, the request may be generated dynamically or automatically. For instance, an application may determine that a volume should be duplicated based on factors such as an amount of I/O traffic associated with the volume.

In some embodiments, the volume may be moved from one node to a different node, in which case the volume may be removed from the source node after it is copied. Alternately, the volume may be copied from one node to a different node. For example, a volume may be replicated across two or more nodes to facilitate data redundancy and/or improved I/O performance.

At 404, the data blocks included in the earliest snapshot are copied from the source node to the destination node. According to various embodiments, copying the data blocks may involve identifying each data block referenced within the earliest snapshot and then moving those data blocks to the storage volume at the destination node. As discussed herein, each snapshot is a collection of references to data blocks. Some of those data blocks may be included in a previous snapshot or remain on the storage volume, while others may have been overwritten at a later point in time and now be located only within the snapshot.

At 408, a determination is made as to whether any snapshots associated with the source node volume remain uncopied. According to various embodiments, snapshots may be copied successively until no snapshots remain uncopied. For example, after copying the Snapshot S1 210 shown in FIG. 2, the Snapshot S2 212 may be selected for copying.

A destination node snapshot corresponding to the last restored snapshot is created at operation 410. According to various embodiments, creating a snapshot may involve compiling a list of data blocks included in the snapshot. For example, a list of data block identifiers may be created at the destination node corresponding with data blocks associated with the snapshot as stored on the source node. The snapshots may be copied in order of their creation to facilitate the copying of data included in a snapshot by reference. For example, when copying the Storage Volume A1 118 to the Node B 130 as shown in FIG. 2, the Snapshot S2 212 may be selected initially.

At 412, one or more data blocks that have changed between the created snapshot and the next snapshot are identified. According to various embodiments, the data blocks may be identified at the source node and/or the target node by comparing data block references in the selected snapshot to those of the next snapshot. For example, in the example shown in FIG. 3, the data portion D 308 includes references to data blocks that have changed between the Snapshot S1 210 and the Snapshot S2 212.

At 414, the identified data blocks are copied from the source node to the destination node. According to various embodiments, the identified data blocks may be copied by transferring only those data blocks that have changed between the selected snapshot and the next snapshot.

If no additional snapshots associated with the source node volume remain uncopied then at 416 a final snapshot corresponding to the last restored snapshot is created in a manner similar to that performed at the operation 416. Finally, at operation 418, the destination storage volume is resynchronized with the source volume. According to various embodiments, the volumes may be accumulating data write instructions received at the source volume since the last copied snapshot. These data write instructions may then be executed in sequence at the destination volume in order to update the state of the destination volume from the state of the last copied snapshot to the current state of the source volume.

Figure 5:
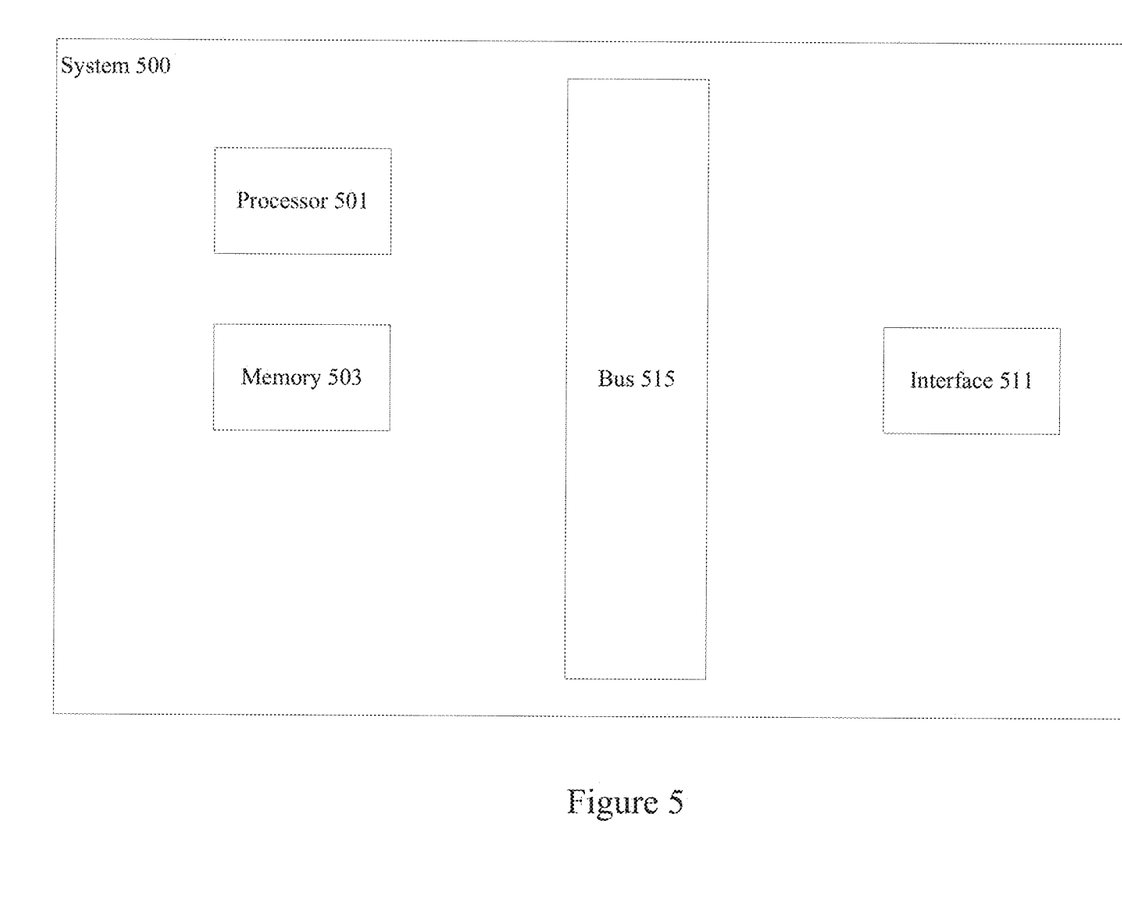
FIG. 5 illustrates an example of a server, configured in accordance with one or more embodiments.

FIG. 5 illustrates one example of a server. According to particular embodiments, a system 500 suitable for implementing particular embodiments of the present invention includes a processor 501, a memory 503, an interface 511, and a bus 515 (e.g., a PCI bus or other interconnection fabric) and operates as a container node. When acting under the control of appropriate software or firmware, the processor 501 is responsible for implementing applications such as an operating system kernel, a containerized storage driver, and one or more applications. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a server configured to run a container engine. For example, the system 500 may be configured as a storage container node as shown herein. The server may include one or more hardware elements as shown in FIG. 5. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

Figure 6:
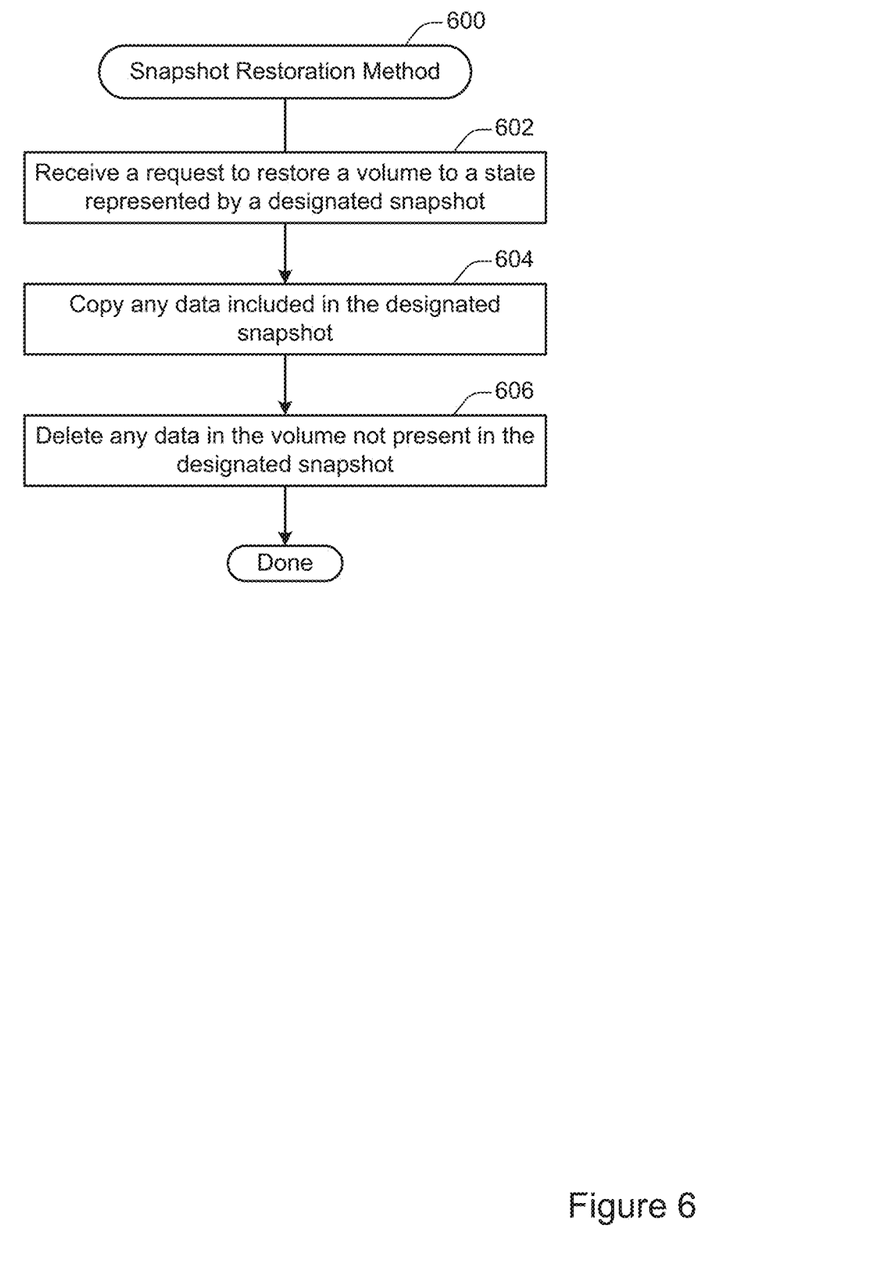
FIG. 6 illustrates an example of a method for restoring a snapshot, performed in accordance with one or more embodiments.

FIG. 6 illustrates an example of a method 600 for restoring a snapshot, performed in accordance with one or more embodiments. The method 600 may be performed at a computing node on which a storage volume is located, such as the Node B 130 shown in FIG. 2.

At 602, a request is received to restore a volume to a state represented by a designated snapshot. For instance, the request may designate the Snapshot T2 222 for restoration of the Volume B1 138.

According to various embodiments, such a request may be received in any of a variety of circumstances. For example, the storage volume may have become corrupted. As another example, a user or application may have inadvertently deleted or overwritten important data blocks stored in the volume. As yet another example, application logic may determine that recent changes to the application state should be ignored.

At 604, any data blocks included in the designated snapshot are copied to the volume. According to various embodiments, copying the data may include transferring data into the volume. For example, the data blocks included in the data portion G 314 shown in FIG. 3 may be copied to the storage volume B1 138.

In some embodiments, data blocks included in the snapshot by reference (direct or indirect) to the volume itself need not be copied because such data blocks are already present in the volume. For example, data blocks included in the data portion G 314 by reference to the data portion E 310 and thereby by reference to the storage volume B1 138 need not be copied because it is already present in the storage volume B1 138.

At 606, any data blocks present in the volume but not present in the designated snapshot re deleted. For example, a difference may be calculated between the data present in the storage volume B1 138 and the data present in the data portions G 314 and H 316 shown in FIG. 3.

In particular embodiments, one or more operations shown in FIG. 6 may be performed in parallel or in an order different from that shown in FIG. 6. For example, any or all of operations 604 and 606 may be performed in parallel.

Figure 7:
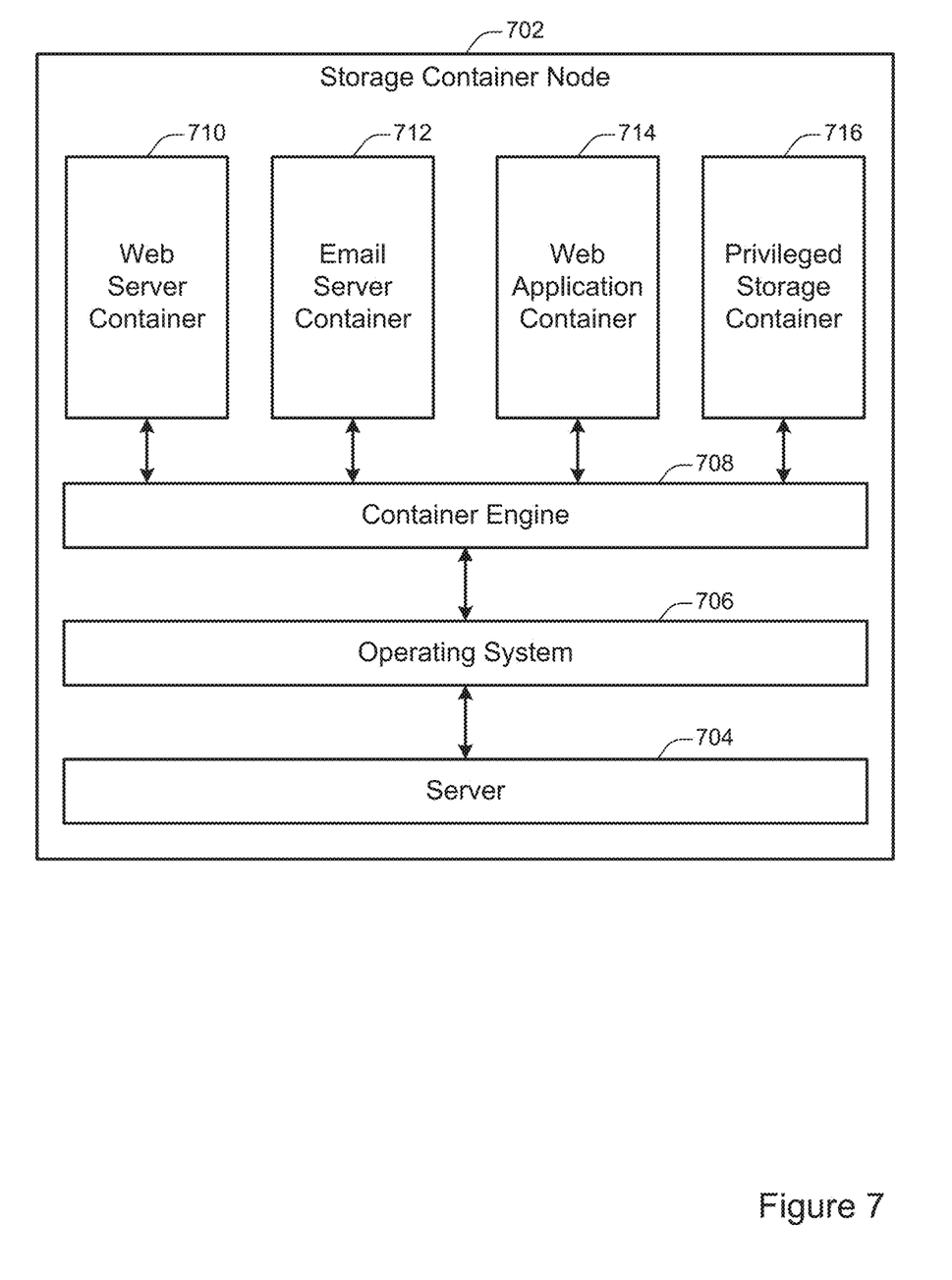
FIG. 7 illustrates an example of a storage container node, configured in accordance with one or more embodiments.

FIG. 7 illustrates an example of a storage container node 702. According to various embodiments, a storage container node may be a server configured to include a container engine and a privileged storage container. The storage container node 702 shown in FIG. 1 includes a server layer 704, an operating system layer 706, a container engine 708, a web server container 710, an email server container 712, a web application container 714, and a privileged storage container 716.

Techniques and mechanisms described herein may facilitate the operation of a scalable storage container node system. In some embodiments, a scalable storage container node system may allow application containers in a virtualized application system to quickly and directly provision and scale storage. Further, the system may be configured to provide one or more user experience guarantees across classes of applications. According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines.

Techniques and mechanisms described herein facilitate the operation of distributed stateful microservices in conjunction with a distributed, containerized storage system. In a containerized application system based on technology such as Docker or Kubernetes, each compute node implements a container layer that runs in an operating system. The container layer acts as an intermediate layer to facilitate the execution of one or more container applications. The container system is standardized so that a container application may be instantiated on any of various operating systems and on any of various types of hardware.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data blocks stored on potentially many different storage nodes. A storage node may fail for any of various reasons, such as hardware failure, network failure, software failure, or server maintenance. Data integrity may be maintained even if one or more nodes that make up a storage volume fail during data storage operations.

According to various embodiments, a storage system with components located across different computing devices is referred to herein as a "distributed storage system." Alternately. or additionally, such a storage system may be referred to herein as a "clustered storage system."

In some embodiments, the storage container node 702 may serve as an interface between storage resources available at a server instance and one or more virtual storage volumes that span more than one physical and/or virtual server. For example, the storage container node 702 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

In some embodiments, the storage container node 702 may serve as an interface between storage resources available at a server instance and one or more virtual storage volumes that are replicated across more than one physical and/or virtual server. For example, the storage container node 702 may be implemented on a server that has access to a storage volume implemented on one or more storage devices. At the same time, a different storage container node may be implemented on a different server that has access to the same storage volume. The two storage nodes may then each access data stored on the same storage volume. Additional details regarding the configuration of multiple storage container nodes in the same system are discussed with respect to FIG. 8.

At 704, the server layer is shown. According to various embodiments, the server layer may function as an interface by which the operating system 706 interacts with the server on which the storage container node 702 is implemented. A storage container node may be implemented on a virtual or physical server. For example, the storage container node 702 may be implemented at least in part on the server shown in FIG. 5. The server may include hardware such as networking components, memory, physical storage devices, and other such infrastructure. The operating system layer 706 may communicate with these devices through a standardized interface provided by the server layer 704.

At 706, the operating system layer is shown. According to various embodiments, different computing environments may employ different operating system layers. For instance, a physical or virtual server environment may include an operating system based on Microsoft Windows, Linux, or Apple's OS X. The operating system layer 706 may provide, among other functionality, a standardized interface for communicating with the server layer 704.

At 708, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 704, an operating system layer 706, and a container engine layer 708 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 702 includes the web server container 120, the email server container 712, and the web application container 714. A software container may include customized computer code configured to perform any of various tasks. For instance, the web server container 120 may provide files such as webpages to client machines upon request. The email server 712 may handle the receipt and transmission of emails as well as requests by client devices to access those emails. The web application container 714 may be configured to execute any type of web application, such as an instant messaging service, an online auction, a wiki, or a webmail service. Although that storage container node 702 shown in FIG. 1 includes three software containers, other storage container nodes may include various numbers and types of software containers.

At 716, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 710, 712, and 714 or other software containers located in different computing environments. For example, a software container may transmit a storage request to the container engine 708 via a standardized interface. The container engine 708 may transmit the storage request to the privileged storage container 716. The privileged storage container 716 may then communicate with privileged storage containers located on other storage container nodes and/or may communicate with hardware resources located at the storage container node 702 to execute the request.

In some implementations, one or more software containers may be afforded limited permissions in the computing environment in which they are located. For example, in order to facilitate a containerized software environment, the software containers 710, 712, and 714 may be restricted to communicating directly only with the container engine 708 via a standardized interface. The container engine 708 may then be responsible for relaying communications as necessary to other software containers and/or the operating system layer 706.

In some implementations, the privileged storage container 716 may be afforded additional privileges beyond those afforded to ordinary software containers. For example, the privileged storage container 716 may be allowed to communicate directly with the operating system layer 706, the server layer 704, and/or one or more physical hardware components such as physical storage devices. Providing the storage container 716 with expanded privileges may facilitate efficient storage operations such as storing, retrieving, and indexing data.

Figure 8:
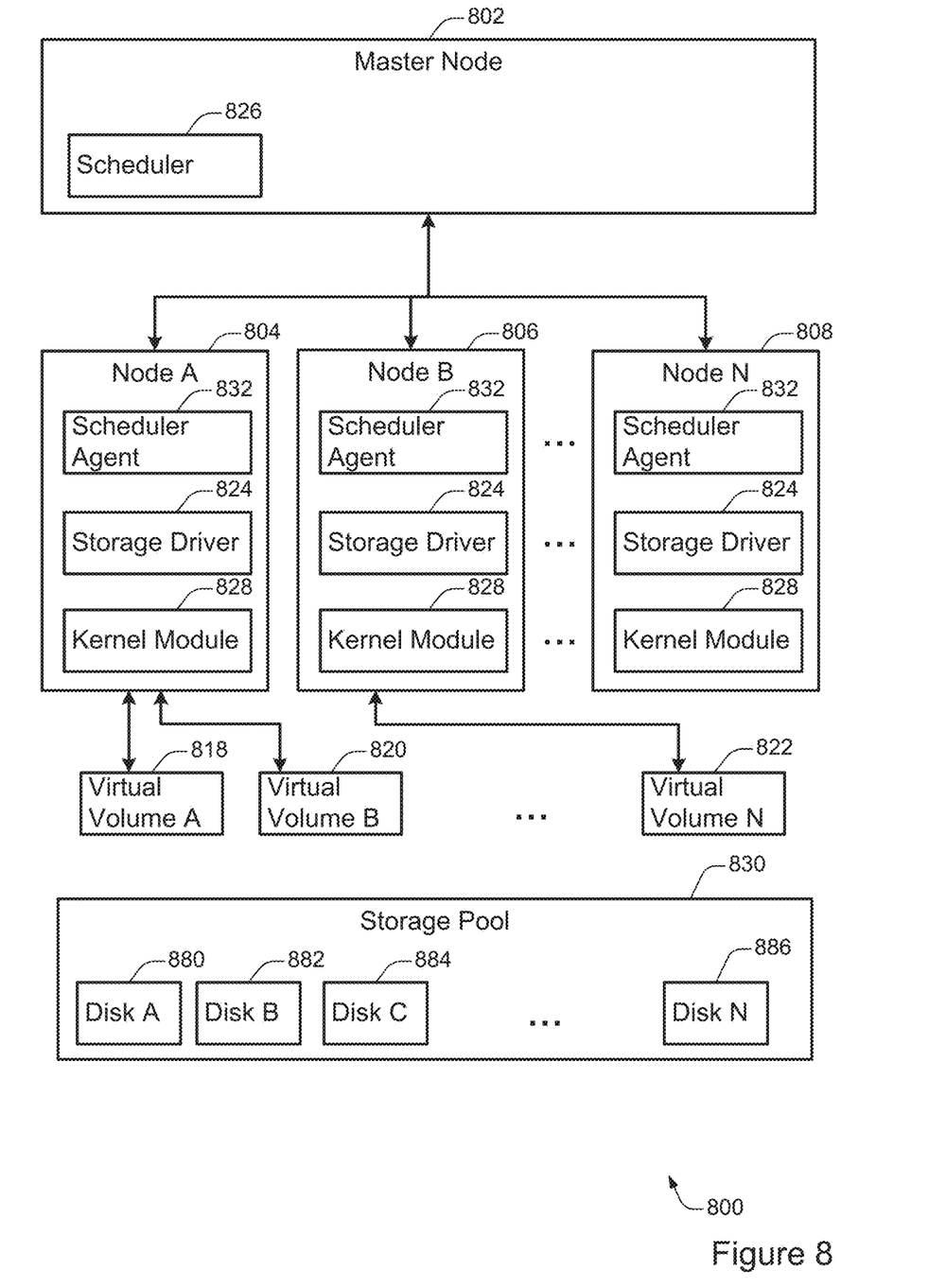
FIG. 8 illustrates an example of an arrangement of components in a containerized storage system, configured in accordance with one or more embodiments.

FIG. 8 illustrates an example of an arrangement of components in a containerized storage system 800, configured in accordance with one or more embodiments. The storage system 800 includes a master node 802 in communication with a plurality of application nodes 804, 806, and 808. Each node has implemented thereon a storage driver 824, a kernel module 828, and a scheduler agent 832. In addition, the master node includes a scheduler 826. Each node can mount one or more of a plurality of virtual volumes 188, 820, and 822. Each virtual volume can include storage space on one or more of a plurality of storage disks 880, 882, 884, and 886 in a storage pool 830.

According to various embodiments, the clustered storage system 800 shown in FIG. 8 may be implemented in any of various physical computing contexts. For example, some or all of the components shown in FIG. 8 may be implemented in a cloud computing environment such as Amazon Web Services (AWS), Microsoft Azure, or Google Cloud. As another example, some or all of the components shown in FIG. 8 may be implemented in a local computing environment such as on nodes in communication via a local area network (LAN) or other privately managed network.

In some implementations, a node is an instance of a container system implemented on a computing device such as the computing device shown in FIG. 5. In some configurations, multiple nodes may be implemented on the same physical computing device. Alternately, a computing device may contain a single node. An example configuration of a container node is discussed in further detail with respect to FIG. 2.

According to various embodiments, each node may be configured to instantiate and execute one or more containerized application instance. Each node may include many components not shown in FIG. 8. These components may include hardware components, such as those discussed with respect to FIG. 5, and/or software components, such as those discussed with respect to FIG. 2.

According to various embodiments, each node may include a storage driver 824. The storage driver 824 may perform any of various types of storage-related operations for the node. For example, the storage driver 824 may facilitate the mounting or unmounting of virtual storage volumes. As another example, the storage driver 824 may facilitate data storage or retrieval requests associated with a mounted virtual storage volume. The storage driver 824 may be substantially similar or identical to the privileged storage container 716 shown in FIG. 2.

In some embodiments, each node may include a kernel module 828. The kernel module may receive from the storage driver a request to unmount a virtual volume. The kernel module may then identify a number of references to the virtual volume. Such a reference may be referred to herein as a block device reference. Each reference may reflect an open file handle or other such interaction between the file system and the virtual volume. If the reference count is zero, then the kernel module may unmount the virtual volume and return a message indicating success. If instead the reference count is positive, then the kernel module may return a message indicating failure.

According to various embodiments, each node may include a scheduler agent 832. The scheduler agent 832 may facilitate communications between nodes. For example, the scheduler 826 in the master node may communicate with the scheduler agent 832. The scheduler agent 832 may then communicate with the storage driver 824 to perform an operation such as unmounting a virtual volume.

In some implementations, the disks 880, 882, 884, and 886 may be accessible to the container nodes via a network. For example, the disks may be located in storage arrays containing potentially many different disks. In such a configuration, which is common in cloud storage environments, each disk may be accessible for potentially many nodes to access. A storage pool such as the pool 830 may include potentially many different disks.

According to various embodiments, the virtual storage volumes 818, 820, and 822 are logical storage units created by the distributed storage system, of which the kernel modules and storage drivers are a part. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

In some embodiments, the master node 802 is configured to manage the operations of the clustered storage system. For example, the scheduler 826 at the master node 802 may be configured to receive a request to mount a virtual volume for use at a particular node. The scheduler 826 may then communicate with that node to provide instructions to mount the virtual volume.

Figure 9:
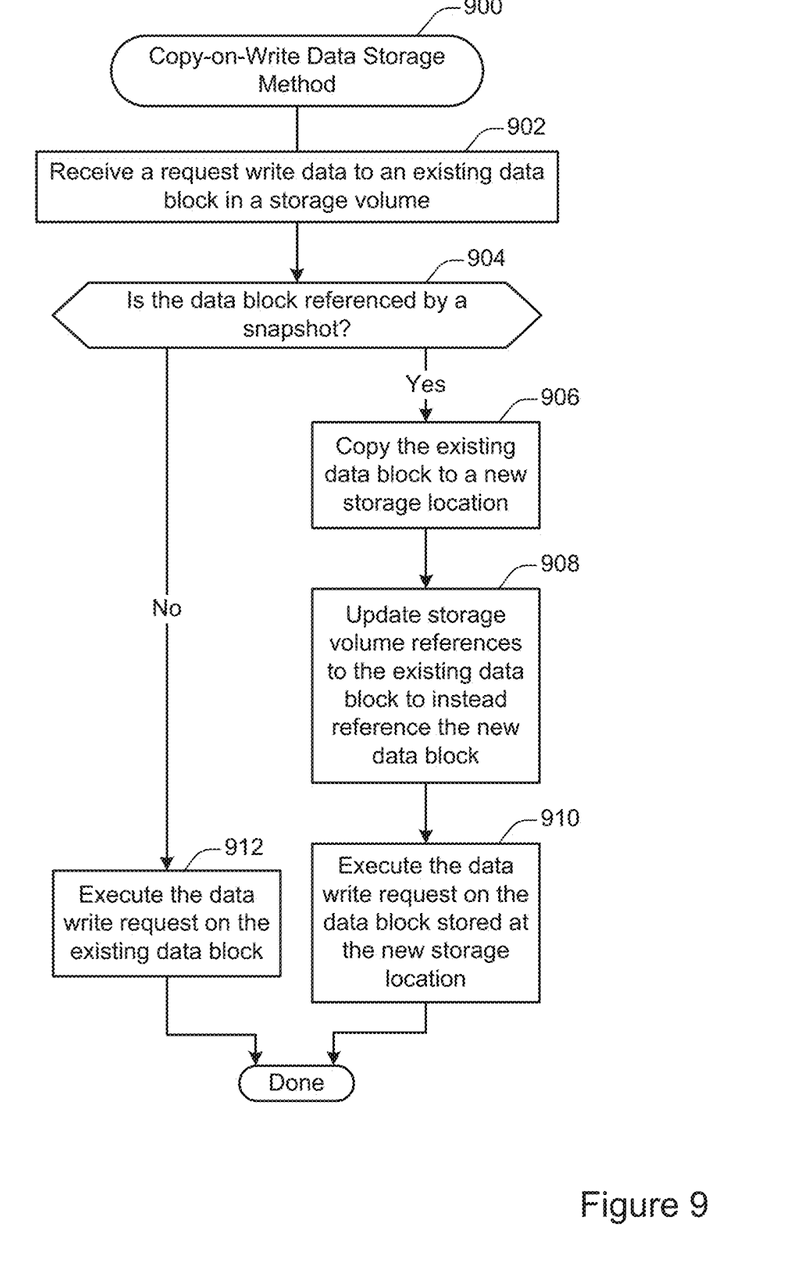
FIG. 9 illustrates an example of a method for storing data in a copy-on-write storage system, performed in accordance with one or more embodiments.

FIG. 9 illustrates an example of a method 900 for storing data in a copy-on-write storage system, performed in accordance with one or more embodiments. According to various embodiments, the method 900 may be performed in order to execute a write request that changes the state of data on a storage volume.

A request to write data to an existing data block in a storage volume is received at operation 902. In some embodiments, the request may include information such as a reference to a storage location of the data block, data to write to the data block, and a portion of the data block to be overwritten.

At 904, a determination is made as to whether the data block is referenced by a snapshot. According to various embodiments, the determination may be made at least in part by consulting a table that lists references to data blocks stored in association with the storage volume. If the data block is not referenced by a snapshot, then the data write request may be executed on the existing data block at operation 912.

If instead the data block is referenced by a snapshot, then at 906 the existing data block is copied to a new storage location. Storage volume references to the existing data block are then updated to refer to the new data block at the new storage location at operation 908. The references that are updated may exclude those that are included in a snapshot so that the snapshots continue to refer to the existing data block as it is maintained in its previous state.

At 910, the data write request is executed on the data block stored at the new storage location. According to various embodiments, executing the data write request may involve writing the data identified in the request received at 902 to the appropriate location within the data block.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
based on a single request to copy a source node volume from a source node to a destination node, copying the source node volume from the source node to the destination node thereby creating a destination node volume, the source node volume including a plurality of source node snapshots, each source node snapshot capturing an entire state of the source node volume at a particular point in time, wherein copying the source node volume from the source node to the destination node includes:
comparing a first plurality of data block references included in a first source node snapshot to a second plurality of data block references included in a second source node snapshot to identify a first portion of data block references and a second portion of data block references, the first source node snapshot and the second source node snapshot being included in the plurality of snapshots, the first portion of data block references being included in both the first plurality of data block references and the second plurality of data block references, the second portion of data block references being included in the second plurality of data block references but not in the first plurality of data block references, the first source node snapshot capturing a state of the source node volume at a first point in time, the second source node snapshot capturing a state of the source node volume at a second point in time, the first point in time preceding the second point in time, each of the first and second portions of data block references identifying a respective storage location of a respective data block associated with the source node volume, the source node volume being mounted at a first compute node that includes a first processor and a first memory module;
copying all data blocks referenced in the first source node snapshot from the source node to the destination node, the destination node including a second processor and a second memory module;
copying the respective data blocks referenced by the second portion of data block references from the source node volume to the destination node volume; and
creating a destination node snapshot corresponding with the second source node snapshot, the destination node snapshot including a third plurality of data block references that each identifies a respective storage location associated with the respective data blocks referenced by the second portion of data block references copied to the destination node volume;
wherein the source node includes a container engine application executed by an operating system, the container engine application providing a platform for instantiation and execution of one or more containerized applications abstracted from the operating system, the one or more containerized applications comprising a privileged storage container application allowed to communicate directly with the operating system, wherein the privileged storage container application of the source node communicates with the destination node to perform the copying of the source node volume from the source node to the destination node.

2. The method recited in claim 1, the destination node snapshot including a fourth plurality of data block references that each identifies a respective storage location associated with data blocks identical to those referenced by the first plurality of data block references.

3. The method recited in claim 1, the method further comprising:
resynchronizing the destination node volume with the source node volume after the destination node snapshot is created.

4. The method recited in claim 1, wherein the first source snapshot and the second source snapshot are part of a temporal sequence of snapshots, and wherein each snapshot in the temporal sequence of snapshots are replicated in temporal order.

5. The method recited in claim 1, wherein the destination node snapshot is a copy-on-write snapshot.

6. A computing system comprising:
a processor; and
memory, the memory storing instructions to execute a method, the method comprising:
based on a single request to copy a source node volume from a source node to a destination node, copying the source node volume from the source node to the destination node thereby creating a destination node volume, the source node volume including a plurality of source node snapshots, each source node snapshot capturing an entire state of the source node volume at a particular point in time, wherein copying the source node volume from the source node to the destination node includes:
comparing a first plurality of data block references included in a first source node snapshot to a second plurality of data block references included in a second source node snapshot to identify a first portion of data block references and a second portion of data block references, the first source node snapshot and the second source node snapshot being included in the plurality of snapshots, the first portion of data block references being included in both the first plurality of data block references and the second plurality of data block references, the second portion of data block references being included in the second plurality of data block references but not in the first plurality of data block references, the first source node snapshot capturing a state of the source node volume at a first point in time, the second source node snapshot capturing a state of the source node volume at a second point in time, the first point in time preceding the second point in time, each of the first and second portions of data block references identifying a respective storage location of a respective data block associated with the source node volume, the source node volume being mounted at a first compute node that includes a first processor and a first memory module;
copying all data blocks referenced in the first source node snapshot from the source node to the destination node, the destination node including a second processor and a second memory module;

copying the respective data blocks referenced by the second portion of data block references from the source node volume to the destination node volume; and creating a destination node snapshot corresponding with the second source node snapshot, the destination node snapshot including a third plurality of data block references that each identifies a respective storage location associated with the respective data blocks referenced by the second portion of data block references copied to the destination node volume;

wherein the source node includes a container engine application executed by an operating system, the container engine application providing a platform for instantiation and execution of one or more containerized applications abstracted from the operating system, the one or more containerized applications comprising a privileged storage container application allowed to communicate directly with the operating system, wherein the privileged storage container application of the source node communicates with the destination node to perform the copying of the source node volume from the source node to the destination node.

7. The computing system recited in claim 6, the destination node snapshot including a fourth plurality of data block references that each identifies a respective storage location associated with data blocks identical to those referenced by the first plurality of data block references.

8. The computing system recited in claim 6, wherein the second compute node is operable to resynchronize the destination node volume with the source node volume after the destination node snapshot is created.

9. The computing system recited in claim 6, wherein the first source snapshot and the second source snapshot are part of a temporal sequence of snapshots, and wherein each snapshot in the temporal sequence of snapshots are replicated in temporal order.

10. The computing system recited in claim 6, wherein the destination node snapshot is a copy-on-write snapshot.

11. One or more non-transitory machine-readable media having instructions stored thereon for performing a method, the method comprising:

based on a single request to copy a source node volume from a source node to a destination node, copying the source node volume from the source node to the destination node thereby creating a destination node volume, the source node volume including a plurality of source node snapshots, each source node snapshot capturing an entire state of the source node volume at a particular point in time, wherein copying the source node volume from the source node to the destination node includes:

comparing a first plurality of data block references included in a first source node snapshot to a second plurality of data block references included in a second source node snapshot to identify a first portion of data block references and a second portion of data block references, the first source node snapshot and the second source node snapshot being included in the plurality of snapshots, the first portion of data block references being included in both the first plurality of data block references and the second plurality of data block references, the second portion of data block references being included in the second plurality of data block references but not in the first plurality of data block references, the first source node snapshot capturing a state of the source node volume at a first point in time, the second source node snapshot capturing a state of the source node volume at a second point in time, the first point in time preceding the second point in time, each of the first and second portions of data block references identifying a respective storage location of a respective data block associated with the source node volume, the source node volume being mounted at a first compute node that includes a first processor and a first memory module;

copying all data blocks referenced in the first source node snapshot from the source node to the destination node, the destination node including a second processor and a second memory module;

copying the respective data blocks referenced by the second portion of data block references from the source node volume to the destination node volume; and creating a destination node snapshot corresponding with the second source node snapshot, the destination node snapshot including a third plurality of data block references that each identifies a respective storage location associated with the respective data blocks referenced by the second portion of data block references copied to the destination node volume;

wherein the source node includes a container engine application executed by an operating system, the container engine application providing a platform for instantiation and execution of one or more containerized applications abstracted from the operating system, the one or more containerized applications comprising a privileged storage container application allowed to communicate directly with the operating system, wherein the privileged storage container application of the source node communicates with the destination node to perform the copying of the source node volume from the source node to the destination node.

12. The one or more non-transitory machine-readable media recited in claim 11, the destination node snapshot including a fourth plurality of data block references that each identifies a respective storage location associated with data blocks identical to those referenced by the first plurality of data block references.

13. The one or more non-transitory machine-readable media recited in claim 11, the method further comprising:

resynchronizing the destination node volume with the source node volume after the destination node snapshot is created.

14. The one or more non-transitory machine-readable media recited in claim 11, wherein the first source snapshot and the second source snapshot are part of a temporal sequence of snapshots, and wherein each snapshot in the temporal sequence of snapshots are replicated in temporal order.

15. The one or more non-transitory machine-readable media recited in claim 11, wherein the destination node snapshot is a copy-on-write snapshot.

16. The method recited in claim 1, wherein the privileged storage container application is allowed to communicate directly with a hardware component of the source node.

17. The method recited in claim 1, wherein the privileged storage container application is allowed to communicate directly with a physical storage device of the source node.

18. The method recited in claim 1, wherein the privileged storage container application is allowed to communicate directly with a server layer that provides an interface between the operating system and a server on which the source node is implemented.

19. The method recited in claim 1, wherein the privileged storage container application of the source node is configured to communicate with a privileged storage container application of the destination node to perform the copying of the source node volume from the source node to the destination node.

20. The method recited in claim 1, wherein the one or more containerized applications further comprise a container application restricted to communicating directly only with the container engine application.

\* \* \* \* \*